United States Patent [19]
Ishii

[11] Patent Number: 6,041,024
[45] Date of Patent: *Mar. 21, 2000

[54] SIGNAL REPRODUCING APPARATUS UTILIZING DISPLACEMENT OF MAGNETIC WALL

[75] Inventor: Kazuyoshi Ishii, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/931,363

[22] Filed: Sep. 16, 1997

[30] Foreign Application Priority Data

Sep. 18, 1996 [JP] Japan .................................. 8-246258

[51] Int. Cl.$^7$ ...................................................... G11B 11/00
[52] U.S. Cl. ............................................. 369/13; 369/116
[58] Field of Search ............................... 369/13, 14, 116, 369/110; 360/114, 59; 365/122; 428/694 ML

[56] References Cited

U.S. PATENT DOCUMENTS

| | | | |
|---|---|---|---|
| 5,353,266 | 10/1994 | Fujii | 369/13 |
| 5,384,758 | 1/1995 | Matsumoto | 369/13 |
| 5,390,162 | 2/1995 | Fukumoto et al. | 369/116 |
| 5,432,774 | 7/1995 | Fukumoto et al. | 369/275.4 |
| 5,485,433 | 1/1996 | Satomura et al. | 369/13 |
| 5,532,984 | 7/1996 | Matsumoto et al. | 369/13 |
| 5,579,293 | 11/1996 | Ishii | 369/13 |
| 5,586,091 | 12/1996 | Ishii et al. | 369/13 |
| 5,621,706 | 4/1997 | Kawano et al. | 369/13 |
| 5,629,909 | 5/1997 | Shiratori | 369/13 |
| 5,661,612 | 8/1997 | Hasegawa et al. | 360/59 |
| 5,740,133 | 4/1998 | Tamanoi et al. | 369/13 |

FOREIGN PATENT DOCUMENTS 6-290496  10/1994  Japan .

*Primary Examiner*—Tan Dinh
*Attorney, Agent, or Firm*—Fitzpatrick, Cella, Harper & Scinto

[57] ABSTRACT

A signal reproducing apparatus reproduces a micro mark by causing a magnetic wall to be displaced on a magnetic recording medium. A partial temperature distribution is caused on the medium by a light beam irradiated thereon by using a heating device. A magnetization direction on the medium is detected by a reproducing circuit and a control circuit controls the heating device so as to form the temperature distribution such as to separate, in terms of time, a timing of the occurrence of a first magnetic wall displacement from the front side of a temperature peak position in the temperature distribution toward the temperature peak position and a timing of the occurrence of a second magnetic wall displacement from the backside of the temperature peak position toward the temperature peak position.

12 Claims, 15 Drawing Sheets

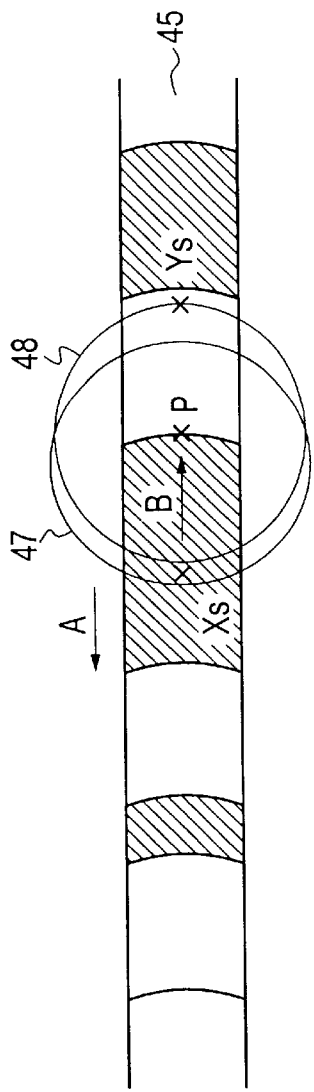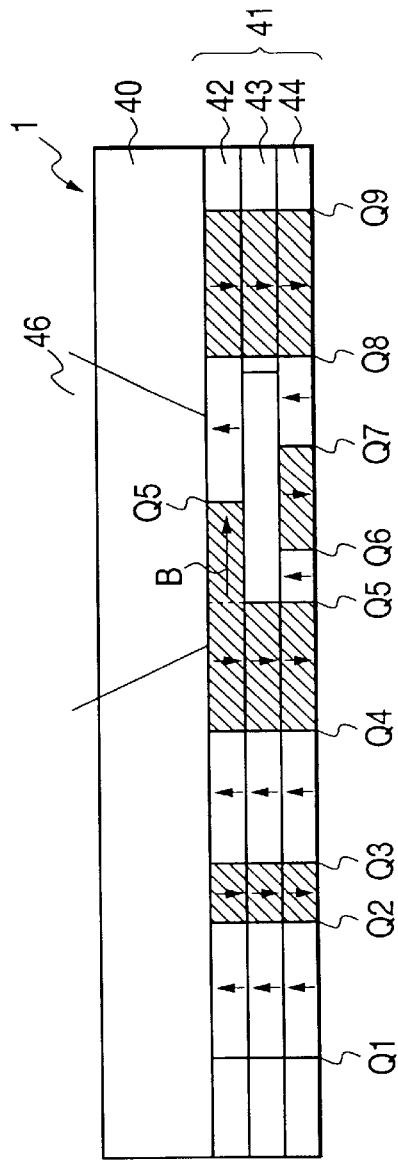
FIG. 2A PRIOR ART
FIG. 2B PRIOR ART

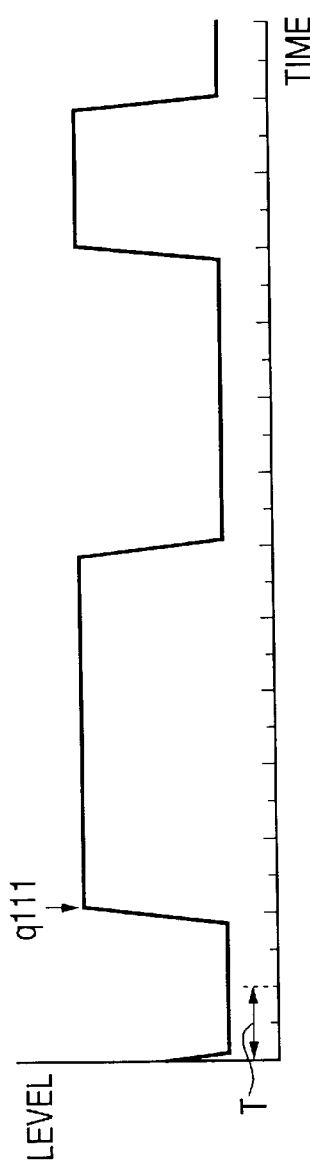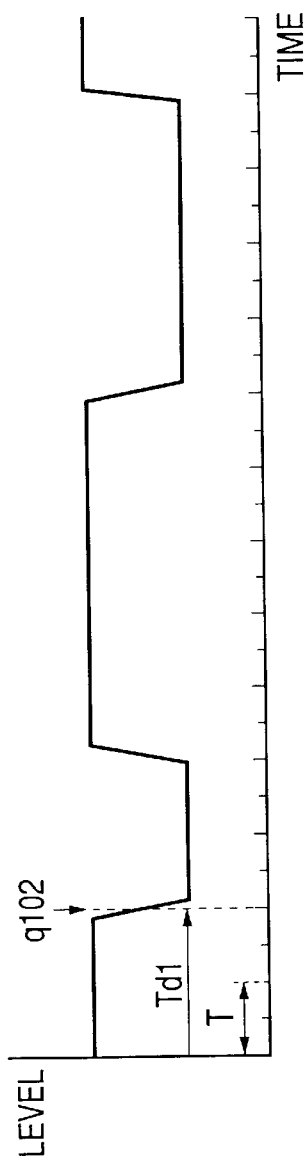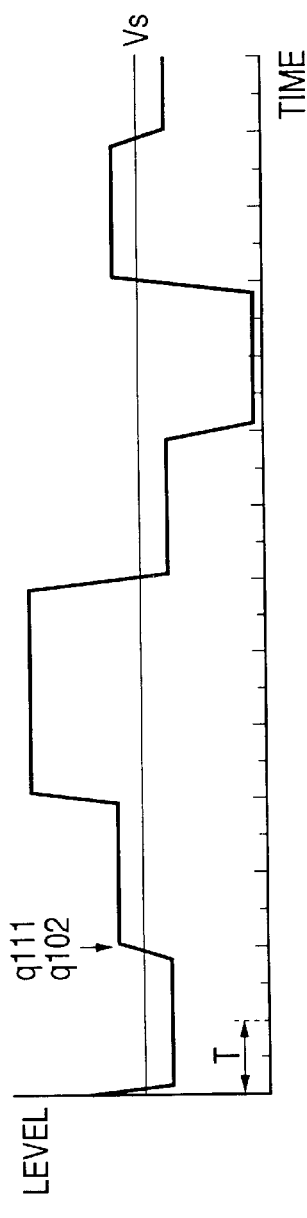
FIG. 7A PRIOR ART
FIG. 7B PRIOR ART
FIG. 7C PRIOR ART

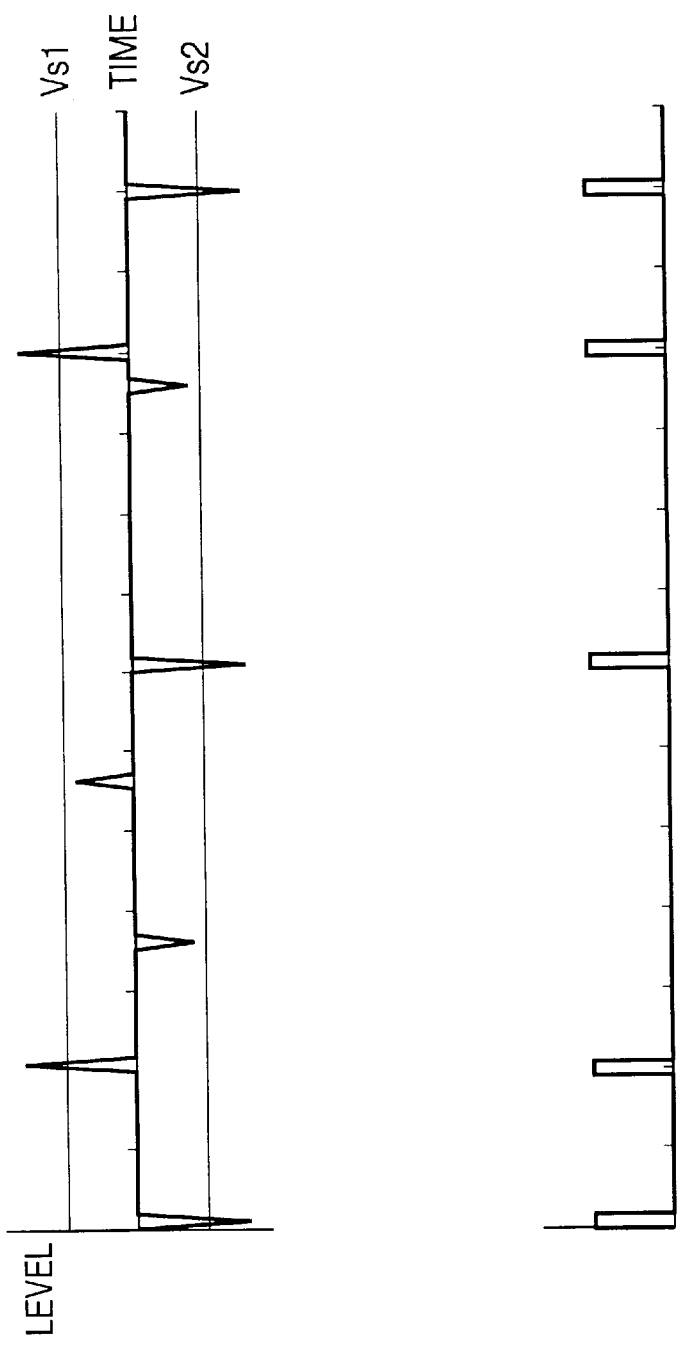

SIGNAL REPRODUCING APPARATUS UTILIZING DISPLACEMENT OF MAGNETIC WALL

BACKGROUND OF THE INVENTION

1. Field of the Invention

The present invention relates to a signal reproducing apparatus for reproducing an information signal recorded on a magnetic recording medium and, more particularly, to a signal reproducing apparatus using a reproducing method by the displacement of a magnetic wall.

2. Related Background Art

Hitherto, as an apparatus for reproducing an information signal recorded on a magnetic recording medium, various apparatuses have been known. Among them, a magneto-optical recording medium, a reproducing apparatus, and a reproducing method proposed in JP-A-6-290496 are effective means for remarkably raising a recording density of an information signal because micro information signal marks can be reproduced while exceeding a diffraction limit of light that is used for reproduction.

FIGS. 1A and 1B are diagrams showing a construction of a magneto-optical recording medium 1 which is used in the above prior art. FIG. 1A is a plan view and FIG. 1B is a cross-sectional view. In FIGS. 1A and 1B, the magneto-optical recording medium 1 comprises a transparent substrate 40 and a magnetic layer 41 formed on the substrate 40. The magnetic layer 41 is constructed by laminating a first magnetic layer (magnetic wall displacing layer) 42, a second magnetic layer (switching layer) 43, and a third magnetic layer (magnetic recording layer) 44. Signal tracks 45 on which an information signal is recorded are formed on the magnetic layer 41. In at least the magnetic wall displacing layer 42, the adjacent signal tracks 45 are magnetically separated. The magnetic wall displacing layer 42 comprises a perpendicular magnetization film in which a magnetic wall coercivity is smaller and a magnetic wall mobility is larger than those of the magnetic recording layer 44. The switching layer 43 comprises a magnetic layer whose Curie temperature is lower than those of the magnetic wall displacing layer 42 and magnetic recording layer 44. The magnetic recording layer 44 comprises a perpendicular magnetization film.

In FIGS. 1A and 1B, information signal marks serving as upward and downward perpendicular magnetization regions are recorded in the magnetic recording layer 44. A magnetization in the magnetic recording layer 44 is also transferred to the magnetic wall displacing layer 42 through the switching layer 43 by an exchange-coupling force acting between the magnetic layers at room temperature. Each of the upward and downward arrows in the diagram indicates a direction of the magnetization. In each layer, magnetic walls Q1, Q2, . . . , and Q9 are formed among the information signal marks magnetized in one direction and the information signal marks magnetized in the reverse direction existing before and after the above information signal marks, respectively.

A principle of the signal reproduction in the above prior art will now be described. In the case of reproducing an information signal, while moving the magneto-optical recording medium 1, a heating light beam for heating the magnetic layer 41 of the magneto-optical recording medium 1 and a reproducing light beam for detecting a state of magnetization as a signal by a magneto-optical effect are irradiated from an optical head to the magnetic layer 41 of the magneto-optical recording medium 1. Although those light beams also can be separately provided, an example in which a light beam only for heating is not provided but a function to heat the magnetic layer 41 is also provided for the reproducing light beam is also disclosed in JP-A-6-290496. With such a construction, there are advantages such that the size and weight of the optical head can be reduced and low costs can be realized because of reasons such that it is sufficient to use one light source, there is no need to perform a relative positional adjustment of the heating light beam and the reproducing light beam, and the like. An example of such a construction will now be described.

FIGS. 2A and 2B are diagrams for explaining the principle of the signal reproduction. FIG. 2A is a plan view and FIG. 2B is a cross-sectional view. In the diagram, reference numeral 46 denotes a light beam irradiated by the optical head. The light beam 46 is irradiated from the magnetic wall displacing layer 42 side so as to converge a micro light spot 47 to the magnetic layer 41 of the magneto-optical recording medium 1. The light beam 46 is relatively moving in the direction shown by an arrow A for the magneto-optical recording medium 1. When the light beam 46 is irradiated as mentioned above, the magnetic layer 41 is heated and a temperature distribution is generated having a peak at a position P that is deviated backward relative to the center of the light spot 47 in its moving direction. Reference numeral 48 denotes an isothermal line indicative of a region where the temperature reaches Ts as a temperature near the Curie temperature of the switching layer 43. The temperature of the magnetic layer 41 rises while exceeding the temperature Ts at a position Xs that is deviated to the front side of the light spot 47. After the temperature reaches the peak at the position P, it starts to decrease and is lower than the temperature Ts at a position Ys that is deviated to the back of the light spot 47.

At a position away from the heating portion by the light beam 46, the temperature of the magnetic layer 41 is sufficiently low, the magnetic wall displacing layer 42 is exchange-coupled to the magnetic recording layer 44 through the switching layer 43, and the temperature distribution of the magnetic layer 41 is almost uniform. Therefore, a force such as to displace the magnetic walls transferred to the magnetic wall displacing layer 42 does not act, so that the magnetic walls are fixed. A temperature of the portion which has reached the position Xs of the switching layer 43 rises to Ts and the magnetization disappears. Therefore, the magnetic wall (magnetic wall Q5 in the example shown in the diagram) which has reached the position Xs is not restricted by the exchange-coupling force in the magnetic wall displacing layer 42 but is subjected to a force by a gradient of the temperature. Thus, in the magnetic wall displacing layer 42, the magnetic wall Q5 is displaced in the direction shown by an arrow B in which the temperature is higher and a magnetic wall energy is low, namely, toward the peak position P of the temperature. Therefore, at the irradiating position of the light spot 47 of the magnetic wall displacing layer 42, as shown in the diagram, an enlarged magnetization region of a predetermined size is formed irrespective of a size of an original information signal mark (magnetization region). By using a magneto-optic effect caused by that magnetization region, a change in a signal corresponding to the displacement of the magnetic wall as mentioned above is detected by a reflected light of the light beam 46.

The magnetic walls Q1, Q2, . . . , and Q9 which were transferred to the magnetic wall displacing layer 42 as mentioned above sequentially move toward the peak position P of the temperature each time they reach the position Xs in association with the displacement of the light beam 46. A change in a signal corresponding to such a displacement is detected by the optical head. A displacing speed of the magnetic wall is sufficiently higher than a speed of the relative displacement of the light beam 46. Therefore, the signal change is very fast. Even when a length of an information signal mark is smaller than a diameter of light spot 47, since the signal is detected from the enlarged magnetization region of a predetermined size, an amplitude of the signal change is not reduced. A detection signal in which an amplitude is constant and a waveform is close to a rectangular wave can be obtained irrespective of the length of the information signal mark.

In the above prior art, in a case of locally heating the magneto-optical recording medium and displacing the magnetic wall, as mentioned above, in addition to the displacement of the magnetic wall directing from the forward of the peak position of the temperature toward the peak position of the temperature (this displacement is now referred to as a first magnetic wall displacement), a magnetic wall displacement directing from the back of the peak position of the temperature toward the peak position of the temperature (this displacement is now referred to as a second magnetic wall displacement) also occurs. The first and second magnetic wall displacements will now be described with reference to FIGS. 3A and 3B.

FIGS. 3A and 3B show states in which the time elapses from the state shown in FIGS. 2A and 2B, the light beam 46 moves, and the magnetic wall Q5 of the magnetic wall displacing layer 42 reaches the position Ys that is deviated backward of the light spot 47. At this position, the temperature of the magnetic layer 41 is lower than Ts and the magnetization again appears in the switching layer 43. Thus, the magnetization of the magnetic recording layer 44 is transferred to the magnetic wall displacing layer 42 through the switching layer 43, so that a micro magnetization region is again transferred to the magnetic wall displacing layer 42 together with the magnetic wall Q5.

The magnetic wall Q5 is subjected to a force due to the gradient of the temperature and displaces in the direction shown by an arrow C in which the temperature is higher and the magnetic wall energy is lower, namely, toward the peak position P of the temperature. (Strictly speaking, the magnetic wall Q5 itself is not displaced but a magnetic wall Q5' which appears on the front side of the micro magnetization region to constitute a pair together with the magnetic wall Q5 displaces. However, such a displacement is expressed as a second magnetic wall displacement of the magnetic wall Q5 for convenience of explanation.) That is, the magnetic wall causes the first magnetic wall displacement as mentioned above at a time point when it reaches the position Xs. The second magnetic wall displacement occurs at a time point when the time further elapses and the wall reaches the position Ys.

In the construction also providing the function to heat the magnetic layer 41 for the reproducing light beam without using the light beam only for heating, the peak position P of the temperature generally occurs on the inside of the light spot 47 in the temperature distribution which is formed by the irradiation of the light beam 46. Therefore, not only the signal change by the first magnetic wall displacement but also the signal change by the second magnetic wall displacement are included in the signal that is detected by the optical head. This point will be described further in detail with reference to FIGS. 4, 5A, 5B, 5C and 6.

FIG. 4 shows an example of a recording state of information signal marks of the magnetic recording layer. The information signal which is recorded here is expressed by 0 and 1 and the signal is recorded by using what is called a mark edge recording method such that boundary portions between the information signal mark and the information signal marks before and after it, namely, the magnetic wall is made to correspond to 1 and the portions other than the magnetic wall are made to correspond to 0. A time duration of the information signal mark to be recorded is equal to nT (n is an integer of 1 or more and T is a clock period).

In this instance, ideally, the detection signal of the optical head ought to have a signal waveform in which the level changes in correspondence to the first magnetic wall displacement, as shown in FIG. 5A. Actually, however, as shown in FIG. 5B, a signal waveform including a level change corresponding to the second magnetic wall displacement, namely, a signal which is delayed from a signal of FIG. 5A by only a time Td that is required until the magnetic wall displaces from the position Xs shown in FIG. 2A to the position Ys is superimposed to the ideal signal of FIG. 5A, so that a signal waveform as shown in FIG. 5C is derived.

However, for example, if the operator intends to detect a change in signal level by using means for performing a comparison with a predetermined slice level Vs or the like from such a signal as is usually executed and to obtain a pulse signal corresponding to 1 of the information signal as shown in FIG. 6, the signal cannot be correctly reproduced. In other words, when there is a slight level fluctuation as shown by a broken line in the signal of FIG. 5C, a situation such that erroneous pulse signals are generated as shown in FIG. 6 or, contrarily, pulse signals 52 and 53 to be inherently detected are dropped out occurs. There is, consequently, a problem such that the correct information signal cannot be reproduced.

If means such that the slice level is divided into a plurality of levels so that the change in signal level corresponding to the first magnetic wall displacement can certainly be detected even if a fluctuation in signal level occurs is used, on the contrary, it is likely to erroneously detect the change in signal level corresponding to the second magnetic wall displacement, so that the improving effect cannot be derived. Further, a time difference Td between the timing of the occurrence of the first magnetic wall displacement and the timing of the occurrence of the second magnetic wall displacement is not constant, but variable, and fluctuates depending on a magnitude of the light beam, an environmental temperature, and the like. The signal which is reproduced in association with such a fluctuation also causes a time fluctuation and becomes a cause of erroneous reproduction of the signal. This point will now be described with reference to FIGS. 7A to 7C.

FIG. 7A shows an ideal signal waveform corresponding to the first magnetic wall displacement. FIG. 7B shows a signal waveform which is delayed by only a time Td1 and corresponds to the second magnetic wall displacement. FIG. 7C shows a signal waveform in which the signals of FIGS. 7A and 7B are superimposed. FIG. 7C shows a state in which a signal change q111 in one direction of the signal waveform corresponding to the first magnetic wall displacement of a magnetic wall Q11 in FIG. 7A and a signal change q102 in the reverse direction in the signal waveform corresponding to the second magnetic wall displacement of a magnetic wall Q10 in FIG. 7B simultaneously occur due to the time fluctuation of the reproduction signal as mentioned above. Particularly, in the case where a time duration of the information signal mark constituting the information signal is equal to nT (where n is an integer of 1 or more and T is a clock period), such a state occurs when the time difference Td1 between the timing of the occurrence of the first magnetic wall displacement of a certain magnetic wall and the timing of the occurrence of the second magnetic wall displacement of the same magnetic wall is equal to Td1=mT (where m is an integer of 1 or more). For example, FIG. 7C shows a case where Td1=mT.

However, when the signal changes q111 and q102 simultaneously occur as mentioned above, as shown in FIG. 7C, the change in signal level corresponding to the first magnetic wall displacement of the magnetic wall Q11 is cancelled by the change in the reverse direction of the signal level corresponding to the second magnetic wall displacement of the magnetic wall Q10. Therefore, the change in signal level corresponding to the first magnetic wall displacement is small. Even if it is compared with the slice level Vs or even if any other detecting means is used, it is difficult to certainly detect the signal change. Thus, if a pulse signal is tried to be obtained by detecting the signal change corresponding to 1 of the information signal, pulse signals 54 and 55 to be inherently detected are dropped out as shown in FIG. 8. There is also a problem such that the correct information signal cannot be reproduced.

SUMMARY OF THE INVENTION

It is an object of the invention to further improve the prior art and to provide a signal reproducing apparatus which can correctly reproduce a signal without reproducing an erroneous signal and dropping out a signal to be inherently detected.

The above object is accomplished by a signal reproducing apparatus for reproducing a micro mark by causing a magnetic wall to be displaced on a magnetic recording medium, comprising: heating means which applies a partial temperature distribution onto the medium and is adapted to be movable relative to the medium; reproducing means which detects a magnetization direction on the medium and is adapted to be movable relative to the medium; and means for controlling the heating means so as to form such a temperature distribution as to separate, in terms of time, the occurrence of a first magnetic wall displacement from the front side of a temperature peak position in the temperature distribution toward the temperature peak position and the occurrence of a second magnetic wall displacement from the backside of the temperature peak position toward the temperature peak position.

Explanation will be made in detail in the following embodiment.

BRIEF DESCRIPTION OF THE DRAWINGS

FIGS. 2A and 2B are diagrams for explaining a principle of the signal reproduction in the above document;

FIGS. 7A, 7B, and 7C are signal waveform diagrams showing a state in which a signal change in one direction of the signal by the first magnetic wall displacement and a signal change in the reverse direction of the signal by the second magnetic wall displacement simultaneously occur;

FIGS. 12A and 12B are diagrams showing the signals of the signal detection circuit 7 and signal discrimination circuit 8 in FIG. 10;

DETAILED DESCRIPTION OF THE PREFERRED EMBODIMENTS

Figure 1A:
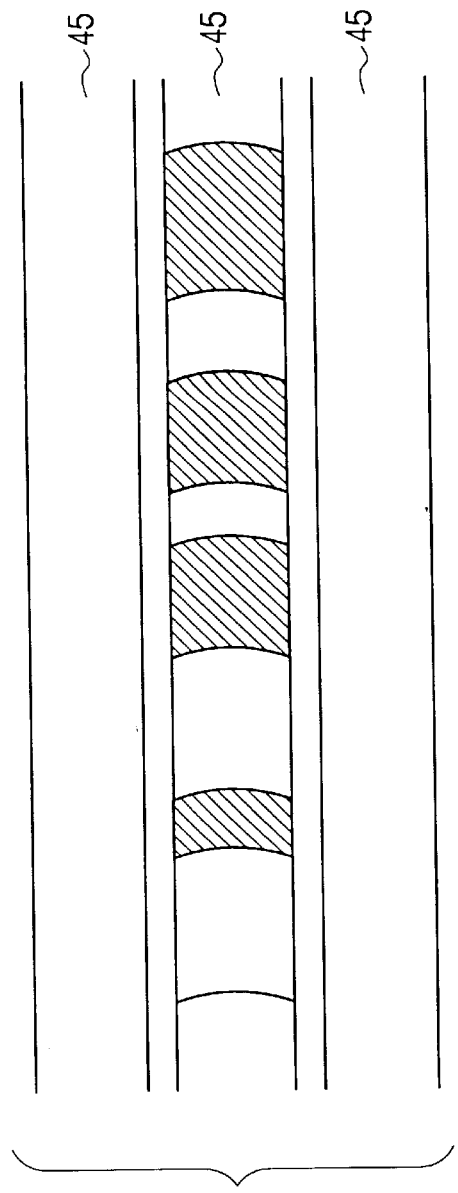
FIGS. 1A and 1B are diagrams showing a magneto-optical recording medium disclosed in JP-A-6-290496.
Figure 1B:
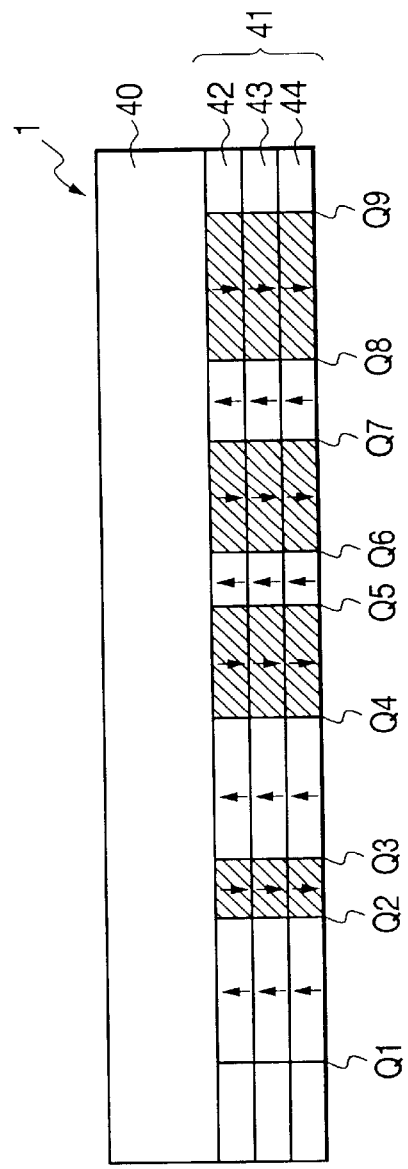
Figure 3A:
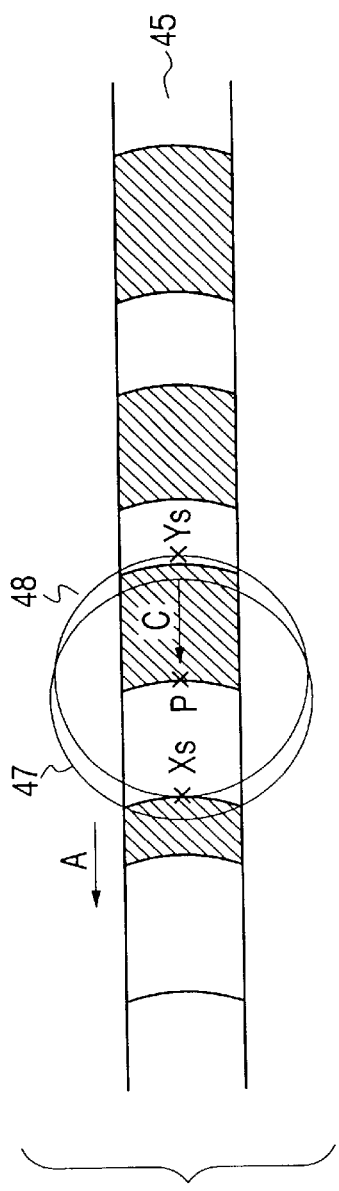
FIGS. 3A and 3B are diagrams for explaining a magnetic wall displacement in the signal reproduction in FIGS. 2A and 2B.
Figure 3B:
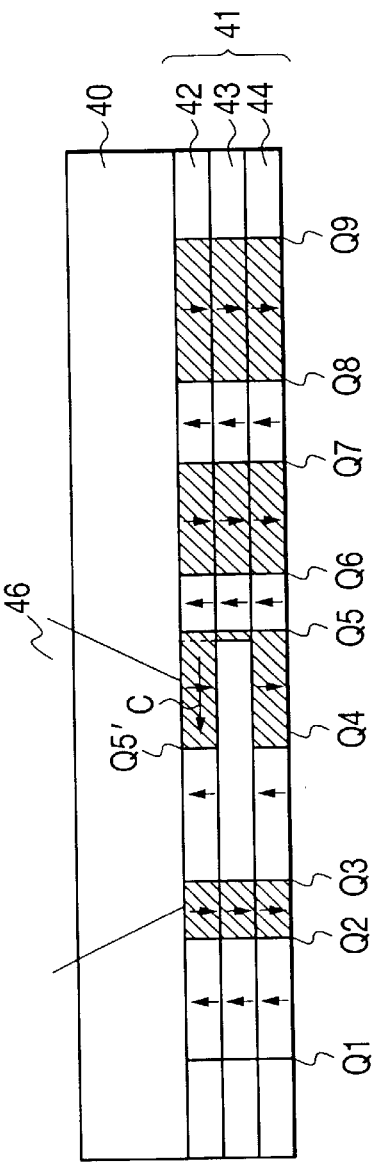
Figure 9:
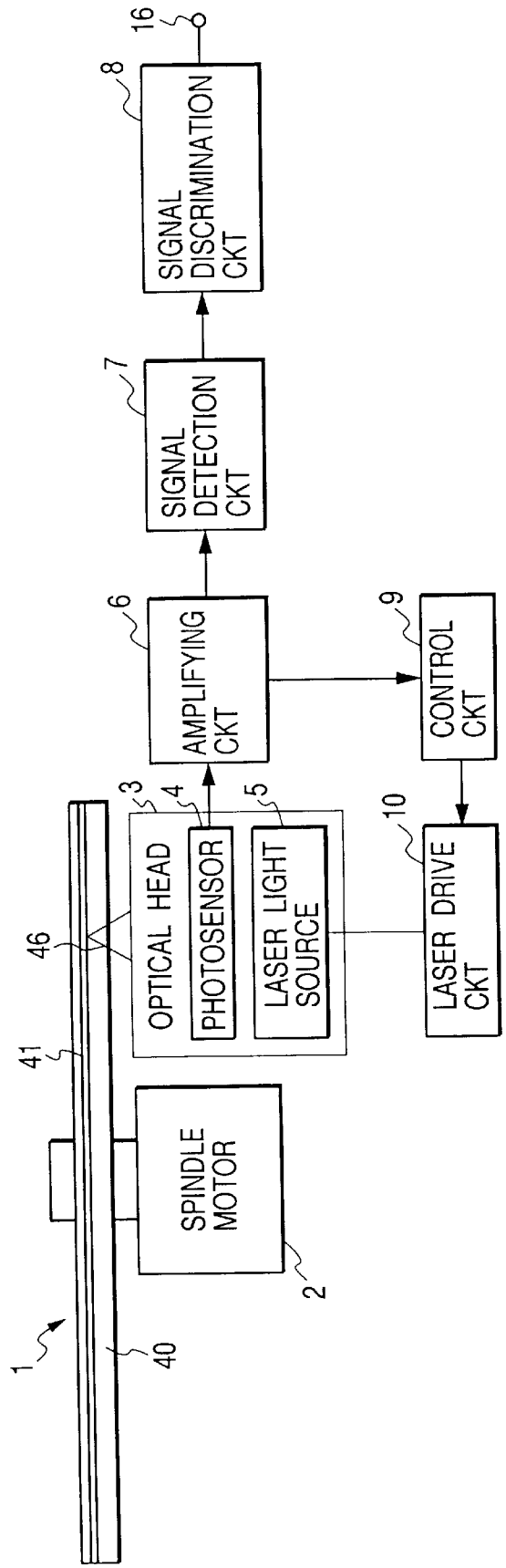
FIG. 9 is a constructional diagram showing the first embodiment of a signal reproducing apparatus of the invention.

The embodiments of the invention will now be described in detail with reference to the drawings. FIG. 9 is a constructional diagram showing the first embodiment of a signal reproducing apparatus of the invention. In FIG. 9, reference numeral 1 denotes the magneto-optical recording medium for recording information. The medium described in FIGS. 1A and 1B is used as a magneto-optical recording medium 1. That is, the recording medium 1 in which the magnetic layer 41 comprising the first magnetic layer 42, second magnetic layer 43, and third magnetic layer 44 is formed on the transparent substrate 40 is used. Since the detailed construction of the magneto-optical recording medium 1 has already been mentioned, its detailed description is omitted. The magneto-optical recording medium 1 is rotated at a predetermined speed by the driving of a spindle motor 2.

An optical head 3 is a head for reproducing the signal recorded on the recording medium 1. The optical head 3 is constructed by: a laser light source 5 for generating a laser beam; an objective lens (not shown) for converging the laser beam from the laser light source 5 as a micro light spot onto the recording medium 1; a photosensor 4 for detecting a reflected light from the recording medium 1; and the like. A laser drive circuit 10 supplies a driving current to the laser light source 5. The laser beam emitted from the laser light source 5 is converged to the micro light spot by the objective lens and is irradiated onto the magnetic layer 41 of the recording medium 1. Reference numeral 46 denotes the converged light beam.

In the case of reproducing the information signal recorded on the magneto-optical recording medium 1, in a rotating state of the magneto-optical recording medium 1, the light beam 46 of a predetermined magnitude is irradiated from the optical head 3 to the magnetic layer 41 and the surface on the signal track on which the information signal has been recorded is scanned by the light spot. Although not shown in FIG. 9, a tracking control circuit and a focusing control circuit are actually provided. A tracking servo and a focusing servo are applied to the light beam 46 of the optical head 3 by those control circuits. The light beam is controlled so as to be focused and traced to the track on the rotating recording medium 1. The information signal is reproduced by using a principle such that the plane of polarization of the reflected light from the magnetic layer 41 is rotated by the Kerr effect in accordance with the magnetization direction corresponding to the recorded information signal. The reflected light from the magnetic layer 41 of the light beam 46 is detected by the photosensor 4 and is converted into an electrical signal. After the detected signal was amplified by an amplifying circuit 6, it is inputted to a signal detection circuit 7 and a control circuit 9.

Figure 10:
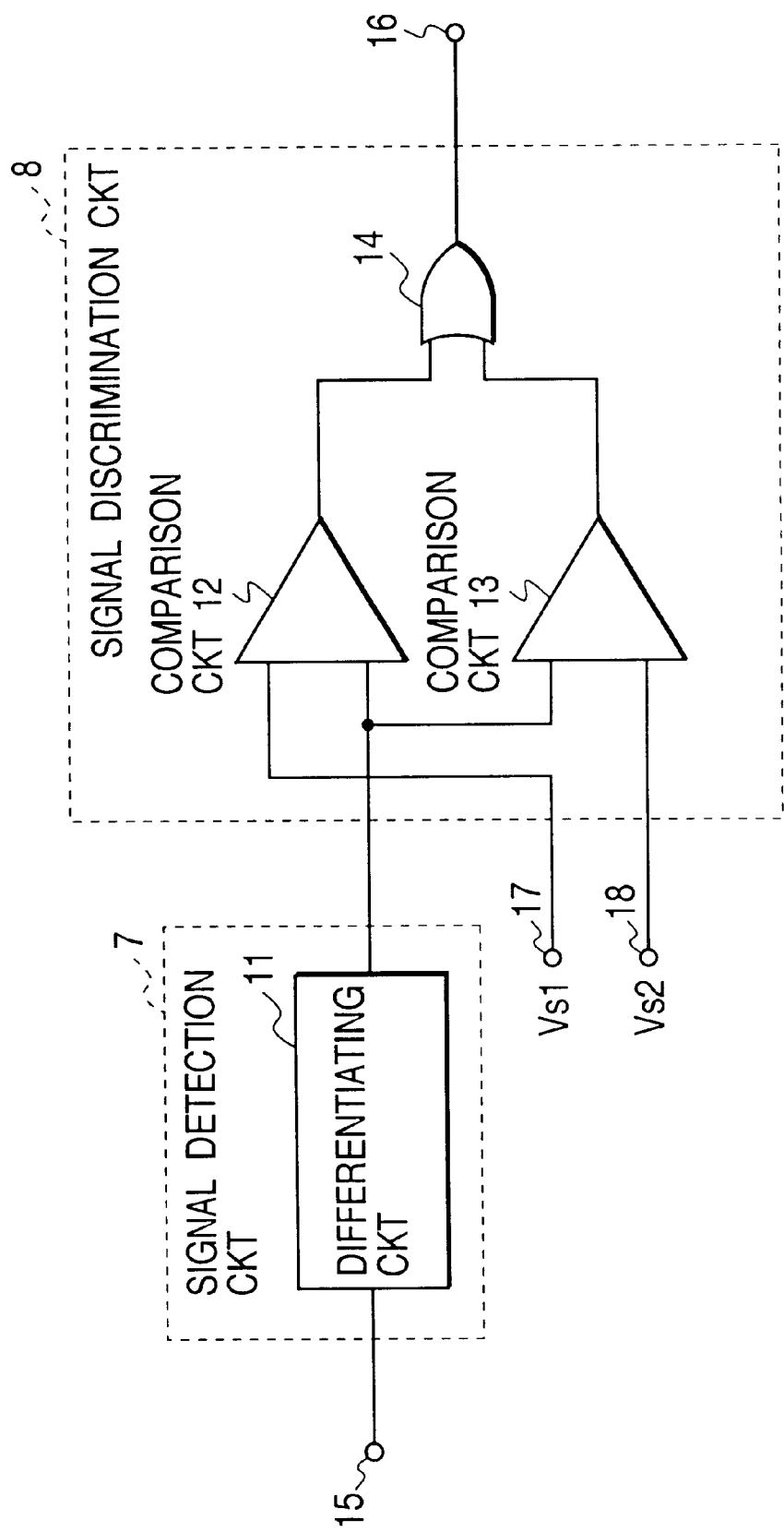
FIG. 10 is a circuit diagram showing in detail a signal detection circuit 7 and a signal discrimination circuit 8 in the embodiment of FIG. 9.

As shown in FIG. 10, the signal detection circuit 7 comprises a differentiating circuit 11 to detect both of the first magnetic wall displacement and the second magnetic wall displacement in the magnetic wall displacing layer of the magneto-optical recording medium 1 to output the detected signal to a signal discrimination circuit 8. As shown in FIG. 10, the signal discrimination circuit 8 is constructed by comparison circuits 12 and 13 and an OR gate 14. Among the signals detected by the signal detection circuit 7, only the signal corresponding to either one of the first magnetic wall displacement and the second magnetic wall displacement is selectively detected and the detected signal is outputted as a reproduction signal of the information signal from an output terminal 16.

The control circuit 9 detects time points of the occurrence of the first and second magnetic wall displacements from the output signal of the amplifying circuit 6, generates a controlling signal to the laser drive circuit 10 on the basis of a detection result, and controls the magnitude of the light beam 46 emitted from the laser light source 5. In the embodiment, by such a control, the light beam 46 of a proper power is irradiated to the magnetic layer 41 in a manner such that a temperature distribution such that a time point at which a probability to cause at least one of the first and second magnetic wall displacements becomes maximum coincides with a time point at which a probability to cause the other magnetic wall displacement becomes minimum is formed in the magnetic layer 41 of the magneto-optical recording medium 1.

Figure 4:
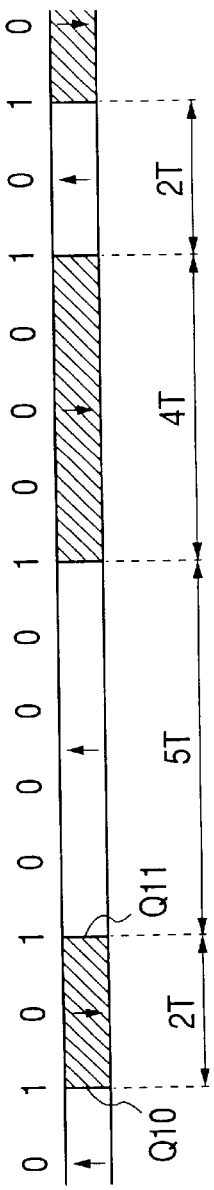
FIG. 4 is a diagram showing an example of information signal marks recorded on the recording medium in FIGS. 1A and 1B.
Figure 5A:
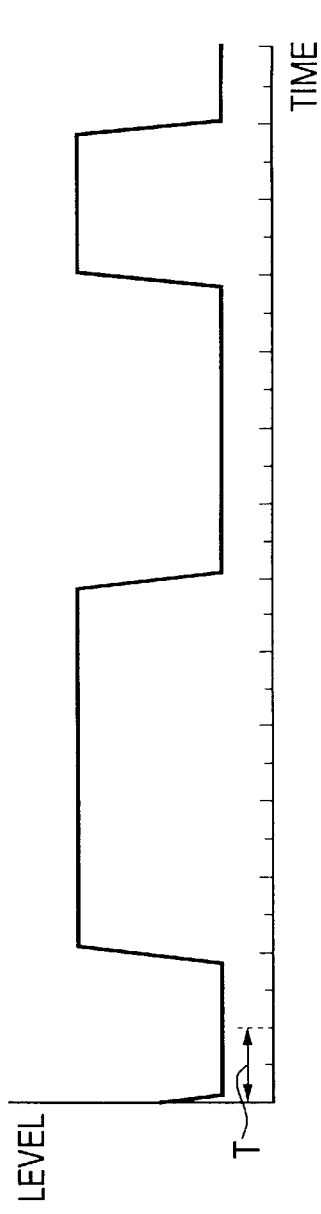
FIGS. 5A, 5B, and 5C are diagrams showing signal waveforms when the information signal marks in FIG. 4 are detected.
Figure 5B:
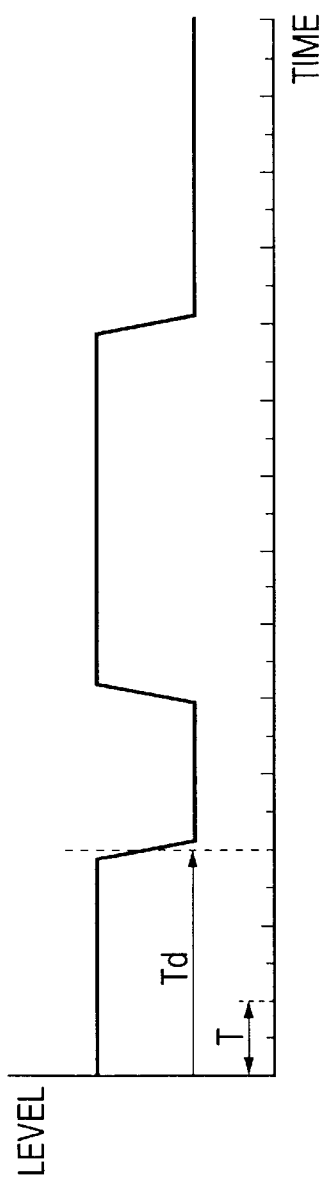
Figure 5C:
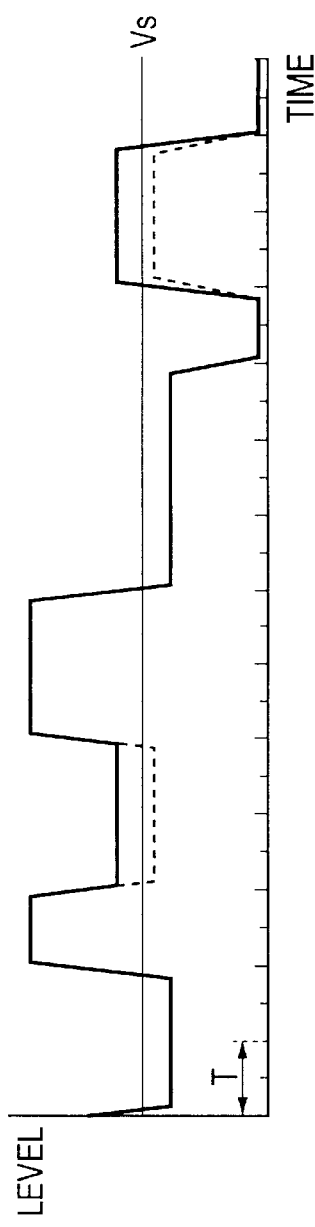
Figure 6:
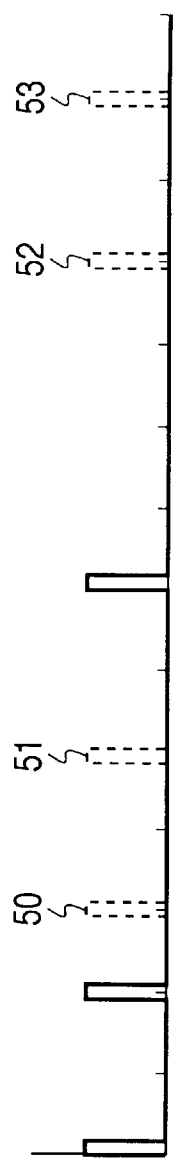
FIG. 6 is a diagram showing pulse signals which are obtained by detecting a change in the signal in FIGS. 5A to 5C.
Figure 8:
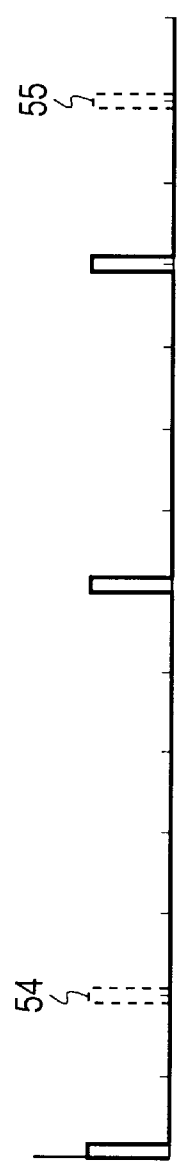
FIG. 8 is a diagram showing a pulse signal which is obtained by detecting the signal changes in FIGS. 7A to 7C.
Figure 11A:
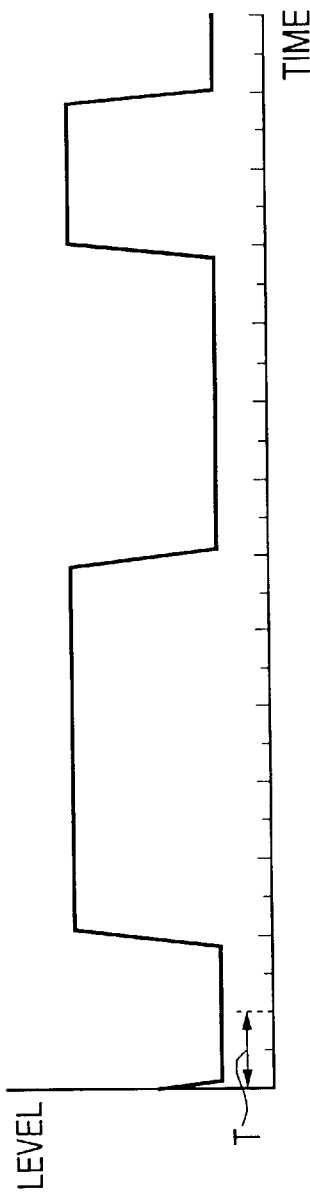
FIGS. 11A, 11B, and 11C are diagrams showing output signals of an amplifying circuit 6 in the embodiment of FIG. 9.
Figure 11B:
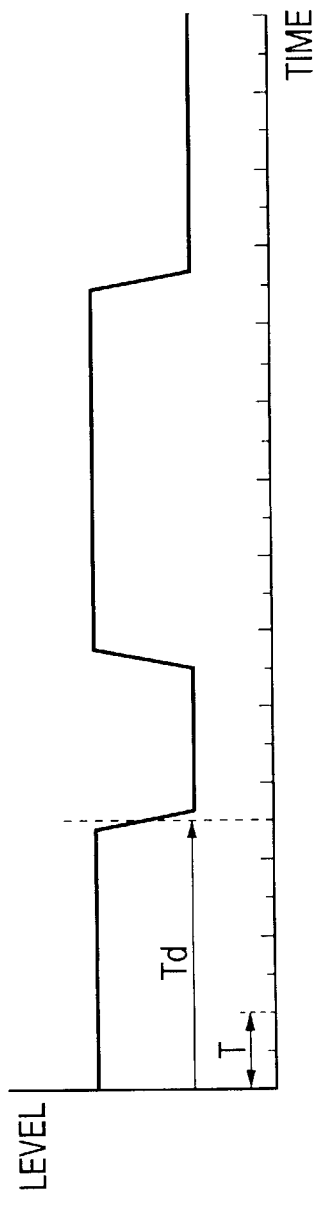
Figure 11C:
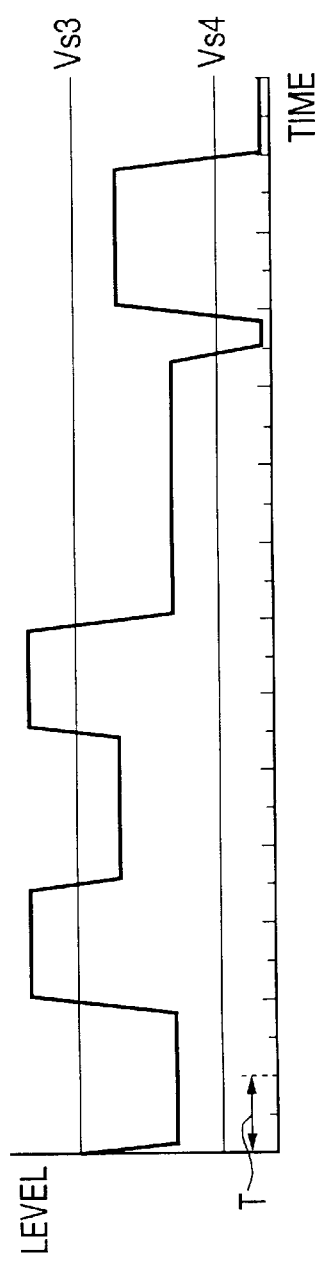

The specific operation of the embodiment will now be described. An example in the case of reproducing the information signal marks in the recording state shown in FIG. 4 will be described. As for the information signal recorded on the recording medium 1, the signal is recorded by a mark edge recording method such that the magnetic wall is made correspond to 1 of the information signal and the portions other than the magnetic wall are made to correspond to 0 of the information signal. A time duration of the information signal mark to be recorded is set to nT (where n is an integer of 1 or more and T is a clock period). FIGS. 11A to 11C show output signals of the amplifying circuit 6.

A waveform of the output signal of the amplifying circuit 6 ideally ought to have a signal waveform whose level changes in correspondence to the first magnetic wall displacement as shown in FIG. 11A. Actually, however, as already described above, the signal waveform including the level change corresponding to the second magnetic wall displacement as shown in FIG. 11B, namely, the signal delayed by the signal waveform of FIG. 11A by only the time Td during which the magnetic wall displaces from the position Xs shown in FIG. 2A to the position Ys is overlapped to the ideal signal waveform of FIG. 11A, so that a signal waveform as shown in FIG. 11C is derived.

In the embodiment, the time Td is controlled so as to satisfy the relation of $Td=(m-(½))T$ (where m is an integer of 1 or more) (for example, Td=3.5 T). Specifically, now assuming that a linear velocity of the magneto-optical recording medium 1 is set to V and a distance between the positions Xs and Ys in the temperature distribution of the magnetic layer 41 in FIGS. 2A and 2B is set to L, since $Td=L/V$, such a control of the time Td is realized by adjusting the magnitude (power) of the light beam 46 by controlling the laser drive circuit 10 by the control circuit 9 so as to form a temperature distribution such that the distance L is set to a predetermined value (such that the isothermal line 48 in FIG. 2A has a predetermined size).

Thus, assuming that a time point at which the first magnetic wall displacement occurs in the magnetic wall displacing layer 42 is set to NT (where N is an integer), a time point at which the second magnetic wall displacement occurs is set to $(M-(½))T$ (where M is an integer). The occurrence of the first magnetic wall displacement and the occurrence of the second magnetic wall displacement are separated with respect to time, so that both of them do not simultaneously occur. In the embodiment, the signal changes corresponding to both of the first and second magnetic wall displacements in the magnetic wall displacing layer 42 are detected by the signal detection circuit 7 from those signals and the pulse signals corresponding to those signal changes are obtained.

A specific reproducing operation will now be described. First, the output signal of the amplifying circuit 6 is inputted to the differentiating circuit 11 from an input terminal 15 of the signal detection circuit 7. The differentiating circuit 11 differentiates the input signal, thereby outputting positive and negative pulse signals as shown in FIG. 12A at a timing when the signal level changes in correspondence to the first and second magnetic wall displacements. As also shown in FIGS. 2A and 2B, since the peak position P of the temperature distribution which is formed in the magnetic layer 41 of the magneto-optical recording medium 1 is located behind the center of the light spot 47, the change in signal level corresponding to the first magnetic wall displacement is larger than the change in signal level corresponding to the second magnetic wall displacement. Therefore, the peak level of the pulse signal which is obtained here and corresponds to the first magnetic wall displacement is higher than that of the pulse signal corresponding to the second magnetic wall displacement. The pulse signal is outputted to the signal discrimination circuit 8 as an output signal of the signal detection circuit 7.

In the signal discrimination circuit 8, only the pulse signal corresponding to the first magnetic wall displacement is selectively detected from the obtained pulse signals by using the difference of the peak levels. Specifically, a slice level Vs1 in FIG. 12A is inputted from an input terminal 17 and a slice level Vs2 is inputted from an input terminal 18, respectively. The comparison circuit 12 compares the output signal of the signal detection circuit 7 with the slice level Vs1. The comparison circuit 13 compares the output signal of the signal detection circuit 7 with the slice level Vs2. The slice level Vs1 is set to a level between the peak level of the positive pulse signal corresponding to the first magnetic wall displacement and the peak level of the positive pulse signal corresponding to the second magnetic wall displacement. The slice level Vs2 is set to a level between the peak level of the negative pulse signal corresponding to the first magnetic wall displacement and the peak level of the negative pulse signal corresponding to the second magnetic wall displacement.

With such a construction, between the pulse signals corresponding to the first and second magnetic wall displacements, the comparing circuits 12 and 13 selectively detect only the positive and negative pulse signals of the high peak level corresponding to the first magnetic wall displacement and generate the pulse signals corresponding to them. Those pulse signals are synthesized by the OR gate 14 and the pulse signal corresponding to 1 of the recorded information signal is outputted as shown in FIG. 12B from the output terminal 16 of the signal discrimination circuit 8.

In the embodiment, since the time points of the occurrence of the first and second magnetic wall displacements are separated, even in the output signal of the differentiating circuit 11, a situation such that the pulse signal corresponding to the first magnetic wall displacement and the pulse signal corresponding to the second magnetic wall displacement are overlapped to be cancelled does not occur. The signal change corresponding to both of the first and second magnetic wall displacements can be certainly detected. In the signal discrimination circuit 8, since only the signal corresponding to the first magnetic wall displacement is selectively detected, the drop-out of the pulse signal corresponding to the recorded information signal and the generation of the erroneous pulse signal don't occur. The information signal can be reproduced at a high fidelity.

The method of selectively detecting the signal corresponding to the first magnetic wall displacement in the signal discrimination circuit 8 is not limited to the method of using the difference between the peak levels of the pulse signal corresponding to the first magnetic wall displacement and the pulse signal corresponding to the second magnetic wall displacement. A difference between the time point of the occurrence of the first magnetic wall displacement and the time point of the occurrence of the second magnetic wall displacement also can be used. For example, a window signal to selectively detect the first magnetic wall displacement can be used. Such an example using the signal discrimination circuit 8 will now be described as a second embodiment.

Figure 13:
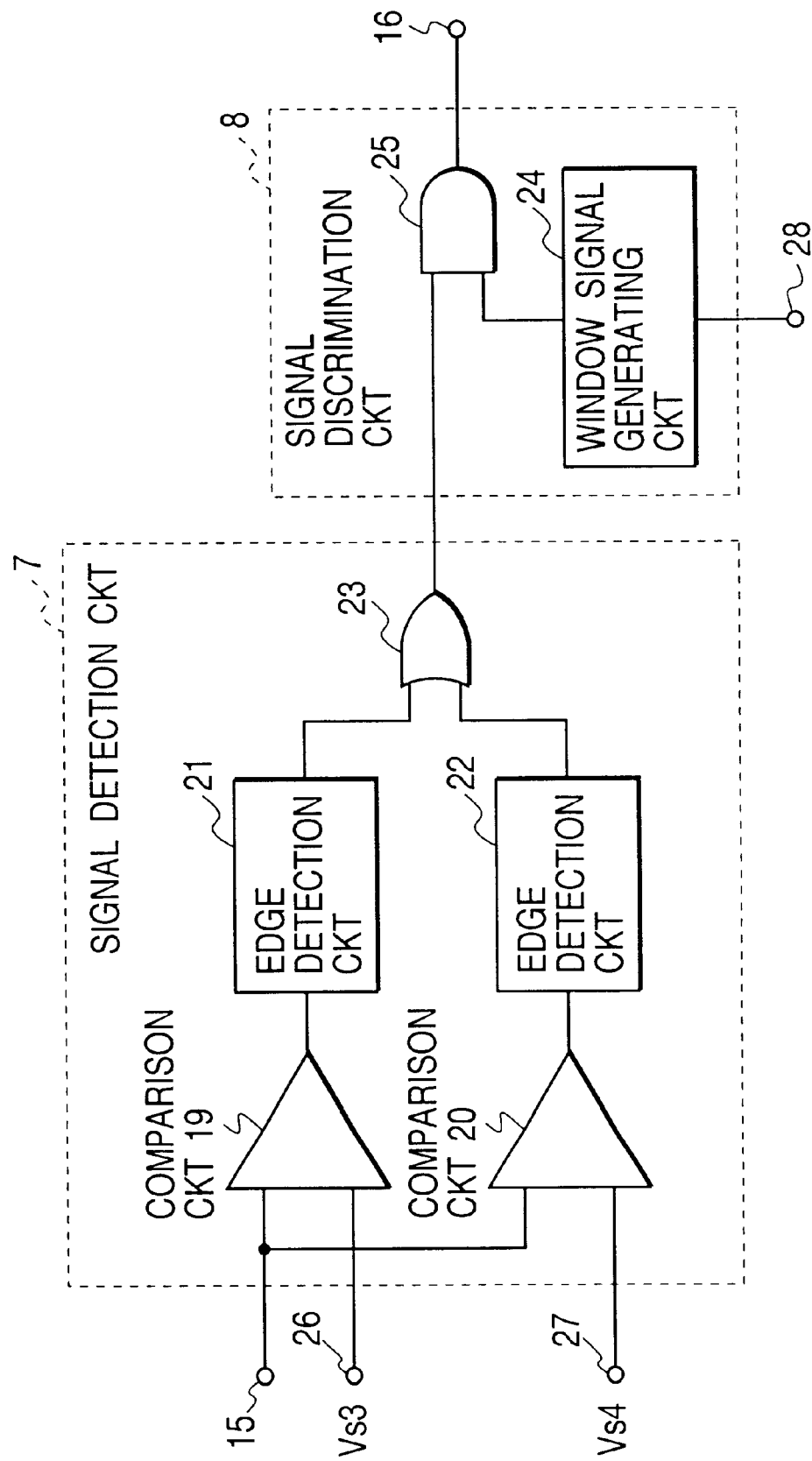
FIG. 13 is a circuit diagram showing in detail a signal detection circuit and a signal discrimination circuit which are used in the second embodiment of the invention.

The second embodiment will now be described. FIG. 13 shows a construction of the signal detection circuit 7 and signal discrimination circuit 8 which are used in the embodiment. The construction other than the signal detection circuit and signal discrimination circuit are substantially the same as those in FIG. 9. In FIG. 13, first, the signal detection circuit 7 comprises comparison circuits 19 and 20, edge detection circuits 21 and 22, and an OR gate 23. The signal discrimination circuit 8 comprises a window signal generating circuit 24 and an AND gate 25. The output signal of the amplifying circuit 6 is inputted from the input terminal 15, a slice level Vs3 shown in FIG. 11C is inputted from an input terminal 26, and a slice level Vs4 is inputted from an input terminal 27 to the signal detection circuit 7, respectively.

Figure 14A:
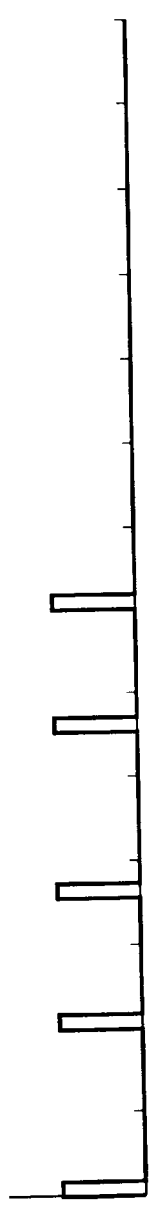
FIGS. 14A, 14B, 14C, 14D and 14E are diagrams showing signals of the signal detection circuit and signal discrimination circuit in FIG. 13.
Figure 14B:
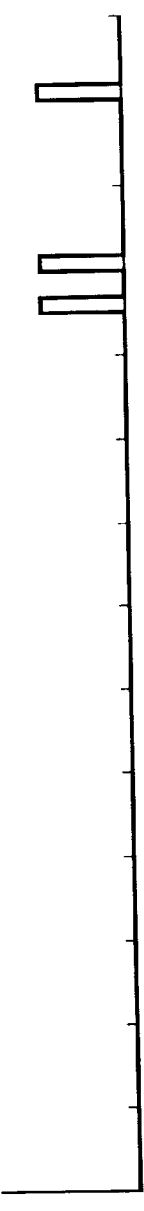
Figure 14C:
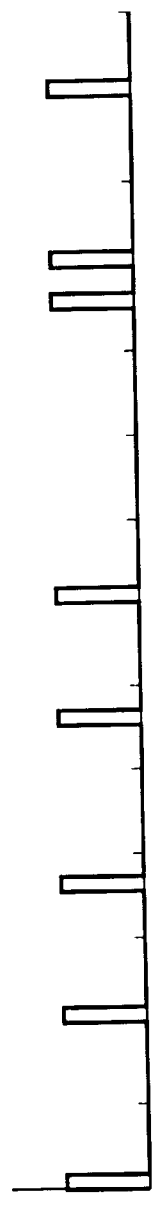

The comparison circuit 19 compares the signal from the amplifying circuit 6 with the slice level Vs3. The comparison circuit 20 compares the signal from the amplifying circuit 6 with the slice level Vs4. Each of the comparison circuits outputs a comparison result by a binary signal. In the edge detection circuits 21 and 22, pulse signals corresponding to edges (leading edge and trailing edge) in the binary signals are outputted, respectively. An output signal of the edge detection circuit 21 is shown in FIG. 14A. An output signal of the edge detection circuit 22 is shown in FIG. 14B. Those pulse signals are synthesized by the OR gate 23, so that a signal including both of the pulse signal corresponding to the first magnetic wall displacement and the pulse signal corresponding to the second magnetic wall displacement is formed as shown in FIG. 14C. The signal of FIG. 14C is inputted to the signal discrimination circuit 8 as an output of the signal detection circuit 7.

Figure 14D:
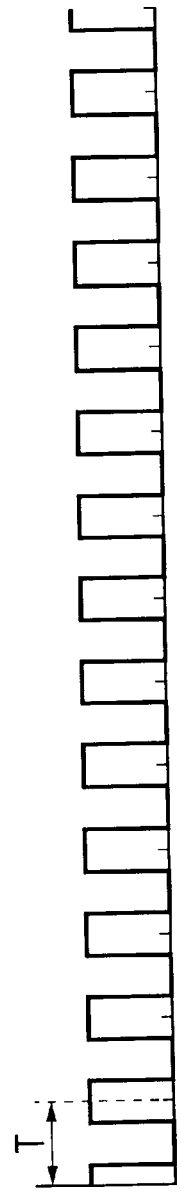
Figure 14E:
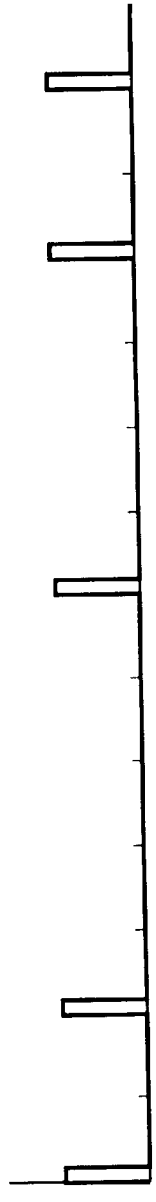

In the signal discrimination circuit 8, a clock signal is inputted from an input terminal 28 to the window signal generating circuit 24. The window signal generating circuit 24 generates a window signal as shown in FIG. 14D on the basis of the input clock signal. The window signal is made up of a pulse train in which a period is equal to T and a width is smaller than T as shown in FIG. 14D. A time duration NT (where N is an integer) serving as a timing when at least the first magnetic wall displacement occurs in the magnetic wall displacing layer is included in the pulse. A time duration $(M-(\frac{1}{2}))T$ serving as a timing when the second magnetic wall displacement occurs is not included in the pulse. The window signal is outputted to the AND gate 25 and the AND between the window signal and the output signal of the signal detection circuit 7 is obtained. Only the pulse signal corresponding to the first magnetic wall displacement is selectively detected as mentioned above. A pulse signal corresponding to 1 of the recorded information signal is outputted as a reproduction signal from the output terminal 16 of the signal discrimination circuit 8 as shown in FIG. 14E.

In the embodiment as well, since the occurrence of the first magnetic wall displacement and the occurrence of the second magnetic wall displacement are separated with respect to time, in the signal that is inputted to the signal detection circuit 7, a situation such that the signal change corresponding to the first magnetic wall displacement and the signal change corresponding to the second magnetic wall displacement are overlapped to be cancelled does not occur. The signal change corresponding to both of the first and second magnetic wall displacements can be certainly detected. In the embodiment, only the pulse signal corresponding to the first magnetic wall displacement is selectively detected in the signal discrimination circuit 8 by using the window signal by using a principle that the time point of the occurrence of the first magnetic wall displacement and the time point of the occurrence of the second magnetic wall displacement are separated with respect to time. Therefore, the drop-out of the pulse signal corresponding to the recorded information signal and the generation of the erroneous pulse signal don't occur, like the first embodiment. The information signal can be accurately reproduced.

In the second embodiment, both of the signal change corresponding to the first magnetic wall displacement and the signal change corresponding to the second magnetic wall displacement are certainly detected in the signal detection circuit 7 irrespective of the fluctuation of the signal level or the like. It is, therefore, also possible to detect such signal changes by using three or more slice levels.

In each of the first and second embodiments, only the signal corresponding to the first magnetic wall displacement is selectively detected and reproduced as an information signal. However, the invention is not limited to such a construction. It is also possible to selectively detect only the signal corresponding to at least one of the first and second magnetic wall displacements and to reproduce the selected signal as an information signal. Further, by selectively detecting each of the signal corresponding to the first magnetic wall displacement and the signal corresponding to the second magnetic wall displacement and by using both of the detection signals, an information signal can be reproduced with a high reliability.

In the ordinary mark edge recording method, as defined in the foregoing embodiments, in many cases, the time duration of the information signal mark to be recorded is equal to nT (where n is an integer of 1 or more and T is a clock period). In such a case, it is most effective to set the time difference Td between the timing of the occurrence of the first magnetic wall displacement of a certain magnetic wall and the timing of the occurrence of the second magnetic wall displacement of the same magnetic wall into a relation of Td=(m−(½))T (where m is an integer of 1 or more). However, generally, the timing for the displacement of the magnetic wall is not always constant with respect to time for the clock signal due to various jitter factors and has a distribution with respect to the probability. The number of information signal marks is not limited to a value that is integer times as large as the clock. There is also a possibility that the information signal marks of an arbitrary time duration are reproduced. In any case, in the invention, it is sufficient that the time point at which a probability to cause at least one of the first and second magnetic wall displacements becomes maximum is made to coincide with the time point at which a probability to cause the other magnetic wall displacement becomes minimum. With this method, the probability to cause the first and second magnetic wall displacements simultaneously is minimized and the maximum effect can be obtained.

For example, when the time duration of the information signal mark to be recorded is equal to nT (where n is an integer of 1 or more and T is a clock period), assuming that the timing when the probability of the occurrence of the first magnetic wall displacement is maximum is set to NT (where N is an integer), it is sufficient to minimize the probability of the occurrence of the second magnetic wall displacement at the same timing. For this purpose, it is sufficient to set the timing when the probability of the occurrence of the second magnetic wall displacement is maximum to (M−(½))T (where M is an integer).

An example of the method of controlling the power of the light beam as mentioned above will now be described. In this example, a controlling signal is previously recorded on a magnetic recording medium and is reproduced, thereby detecting the timings when the first and second magnetic wall displacements occur. In accordance with the detection result, the power of the light beam is controlled so as to form a temperature distribution such that the time point at which a probability to cause one of the first and second magnetic wall displacements becomes maximum coincides with the time point at which a probability to cause the other magnetic wall displacement becomes minimum. With this method, the proper temperature distribution can be formed in the magnetic layer 41 irrespective of the medium characteristics, temperature change, and the like. The effect can be further enhanced.

The effect can be further enhanced by using a method whereby the controlling signal which has previously been recorded on the magnetic recording medium is reproduced, change amounts of signal levels corresponding to the first and second magnetic wall displacements are detected, and the slice level which is used in the signal detection as described in the foregoing embodiment is set to the optimum value on the basis of the detection result. A method of controlling the power of the light beam and a method of setting the slice level in the case of using such a controlling signal will now be described.

Figure 15:
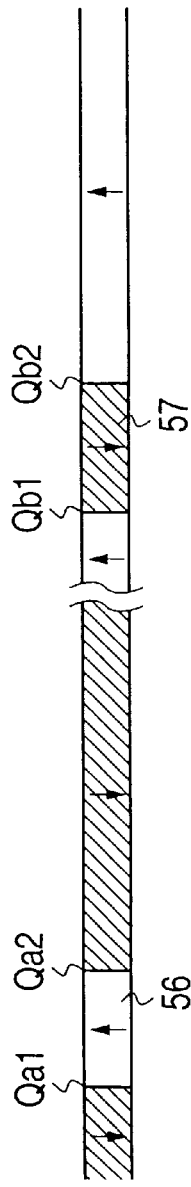
FIG. 15 is a diagram showing an example of controlling signal marks which are previously recorded on a magneto-optical recording medium.

FIG. 15 is a diagram showing an example of controlling signal marks which have previously been recorded on a magneto-optical recording medium. In order to make the identification and separation easy, it is desirable to record the controlling signal into a predetermined region different from that of the information signal by a special pattern different from the information signal. It is further desirable to record the controlling signal at a plurality of positions on the signal track of the magneto-optical recording medium at a predetermined period (for example, every sector). In FIG. 15, a pair of short controlling signal marks 56 and 57 having different magnetization directions are recorded at a sufficient interval. Magnetic walls Qa1 and Qa2 are formed before and after the controlling signal mark 56. Magnetic walls Qb1 and Qb2 are formed before and after the controlling signal mark 57. It is sufficient that such controlling signal marks are recorded by a recording apparatus when the magneto-optical recording medium is manufactured or when the information signal is recorded.

Figure 16:
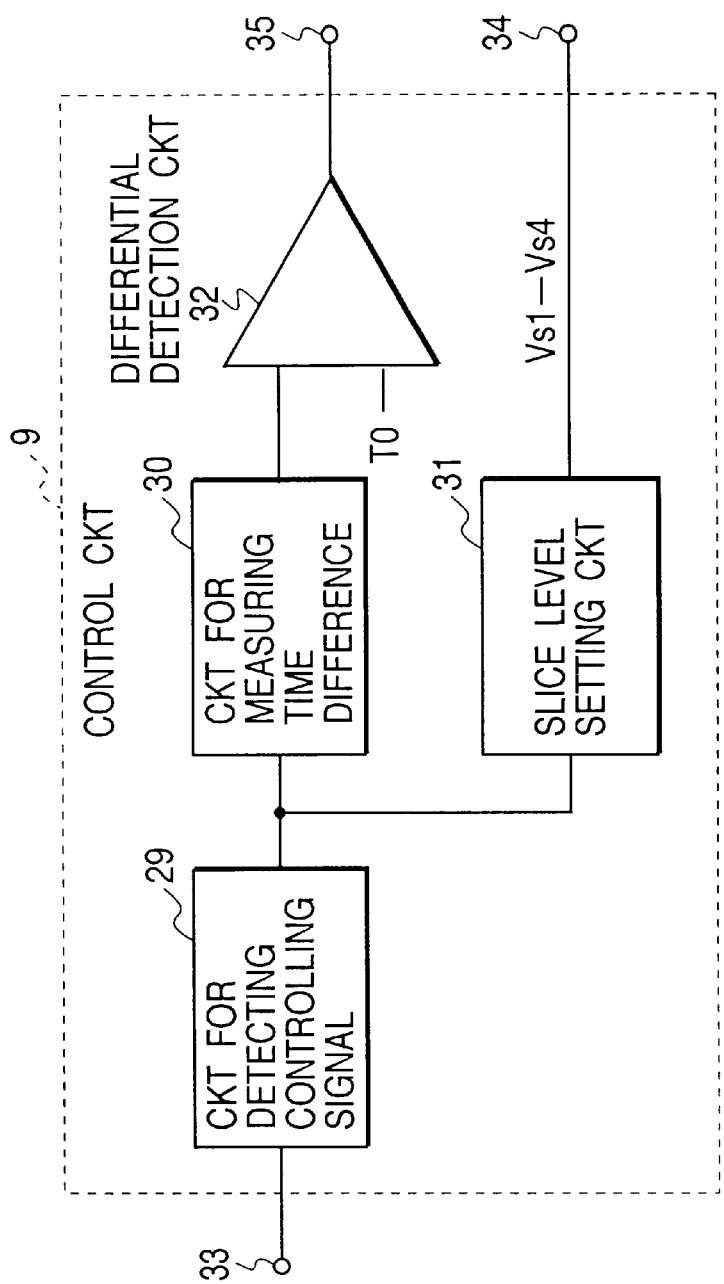
FIG. 16 is a block diagram showing a control circuit for controlling a magnitude of a light beam and a slice level which is used for signal detection by using the controlling signal in FIG. 15.
Figure 17:
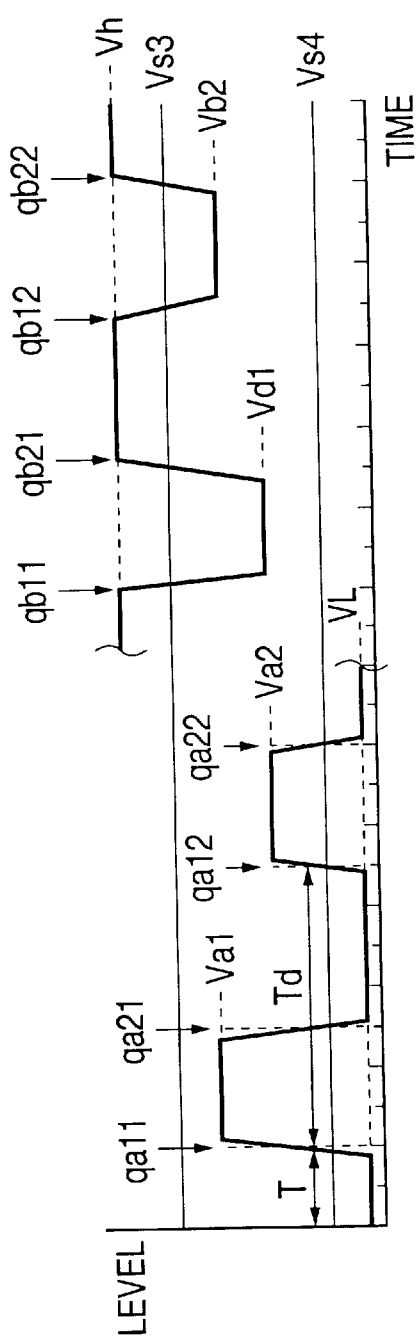
FIG. 17 is a diagram showing an output signal of a controlling signal detection circuit in a control circuit in FIG. 16.

FIG. 16 is a diagram showing a construction of a control circuit for controlling the power of the light beam by using such controlling signal marks or for setting the slice level. In FIG. 16, the control circuit 9 comprises a circuit 29 for detecting a controlling signal, a circuit 30 for measuring a time difference, a slice level setting circuit 31, and a differential detection circuit 32. The controlling signal is amplified by the amplifying circuit 6 together with the information signal and is supplied from an input terminal 33 to the controlling signal detection circuit 29. The controlling signal detection circuit 29 detects the controlling signal separated from the input signal and outputs it to the time difference measuring circuit 30 and slice level setting circuit 31. FIG. 17 shows signal waveforms of the detected controlling signals.

A change in signal level corresponding to the first magnetic wall displacement of the magnetic wall Qa1 in FIG. 15 corresponds to qa11 in FIG. 17. Similarly, a change in signal level corresponding to the second magnetic wall displacement of the magnetic wall Qa1 corresponds to qa12. A change in signal level corresponding to the first magnetic wall displacement of the magnetic wall Qa2 corresponds to qa21. A change in signal level corresponding to the second magnetic wall displacement of the magnetic wall Qa2 corresponds to qa22. A change in signal level corresponding to the first magnetic wall displacement of the magnetic wall Qb1 corresponds to qb11. A change in signal level corresponding to the second magnetic wall displacement of the magnetic wall Qb1 corresponds to qb12. A change in signal level corresponding to the first magnetic wall displacement of the magnetic wall Qb2 corresponds to qb21. A change in signal level corresponding to the second magnetic wall displacement of the magnetic wall Qb2 corresponds to qb22.

In the time difference measuring circuit 30, a time difference between the timing of the occurrence of the first magnetic wall displacement of the magnetic wall and the timing of the occurrence of the second magnetic wall displacement of the same magnetic wall, for example, a time difference between the time point shown by qa11 and the time point shown by qa12 is measured from an output signal of the controlling signal detection circuit 29. Time differences between qa21 and qa22, between qb11 and qb12, and between qb21 and qb22 also can be measured. The measured time difference is outputted to the differential detection circuit 32. The differential detection circuit 32 detects a difference signal between the measured time difference Td and a predetermined value T0. Now, assuming that a time duration of the information signal mark which is recorded is equal to, for example, nT (where n is an integer of 1 or more and T is a clock period), the predetermined value T0 is set to (m−(½))T (where m is an integer of 1 or more) (for instance, T0=3.5 T).

The detected difference signal is outputted from an output terminal 35 to the laser drive circuit 10 in FIG. 9. The laser drive circuit 10 controls a current to be supplied to the laser light source 5 on the basis of the inputted difference signal, thereby controlling the power of the light beam 46 so that a temperature distribution such that the time difference Td always coincides with the predetermined value T0 is formed in the magnetic layer 41. By controlling in this manner, a proper temperature distribution is always formed in the magnetic layer 41 irrespective of a variation in thermal characteristics of each magnetic recording medium, a fluctuation in environmental temperature, and the like. The information signal can be reproduced more stably and with a high reliability.

The method of setting the slice level will now be described. In the case of detecting the controlling signals and setting the slice level, an output signal of the controlling signal detection circuit 29 is supplied to the slice level setting circuit 31. In the slice level setting circuit 31, a signal level Vh before the first magnetic wall displacement of the magnetic wall Qb1, a signal level Vb1 after the first magnetic wall displacement, and a signal level Vb2 after the second magnetic wall displacement are detected from the output signal of the controlling signal detection circuit 29 as shown in FIG. 17. A value between one of the signal levels Vb1 and Vb2 (for example, a smaller one of the differences from the signal level Vh) and the signal level Vh is set as a slice level Vs3 used in the second embodiment. On the other hand, as shown in FIG. 17, a signal level VL before the first magnetic wall displacement of the magnetic wall Qa1, a signal level Va1 after the first magnetic wall displacement, and a signal level Va2 after the second magnetic wall displacement are detected. A value between one of the signal levels Va1 and Va2 (for instance, a smaller one of the differences from the signal level VL) and the signal level VL is set as a slice level Vs4 used in the second embodiment and is outputted from an output terminal 34.

Figure 18:
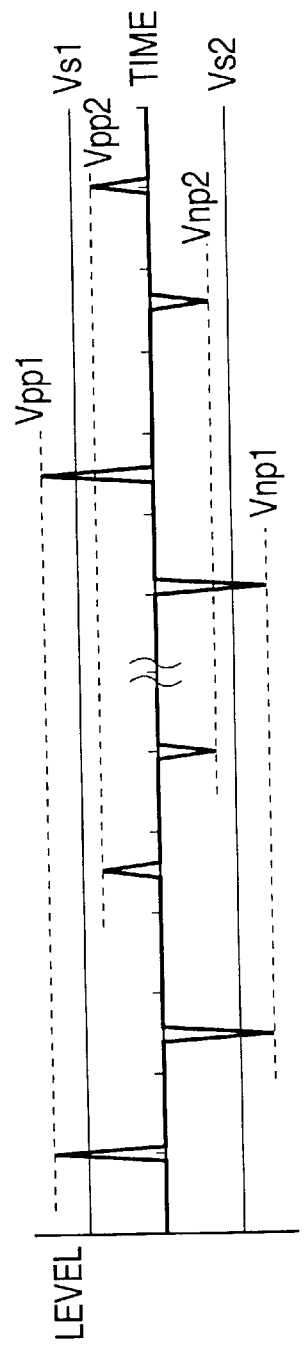
FIG. 18 is a diagram showing a differentiated waveform of the signal in FIG. 17 by a slice level setting circuit in the control circuit in FIG. 16.

Or, the slice level setting circuit 31 differentiates the input signal, forms a differentiated signal as shown in FIG. 18, and detects a peak level Vpp1 of a positive pulse signal corresponding to the first magnetic wall displacement of the magnetic wall Qa1 or Qb2, a peak level Vnp1 of a negative pulse signal corresponding to the first magnetic wall displacement of the magnetic wall Qa2 or Qb1, a peak level Vpp2 of a positive pulse signal corresponding to the second magnetic wall displacement of the magnetic wall Qa1 or Qb2, and a peak level Vnp2 of a negative pulse signal corresponding to the second magnetic wall displacement of the magnetic wall Qa2 or Qb1, respectively. A value between the peak levels Vpp1 and Vpp2 is set as a slice level Vs1 used in the first embodiment. A value between the peak levels Vnp1 and Vnp2 is set as a slice level Vs2 used in the first embodiment. Those values are outputted from the output terminal 34, respectively. By setting the slice level as mentioned above, the information signal can be reproduced more stably and with a high reliability without being influenced by a variation in signal characteristics of each magnetic recording medium and a fluctuation in signal characteristics.

Figure 19:
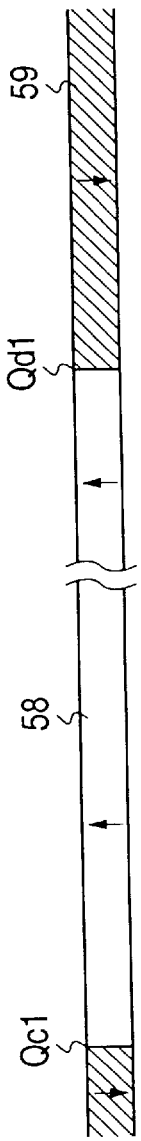
FIG. 19 is a diagram showing another example of controlling signal marks.
Figure 20:
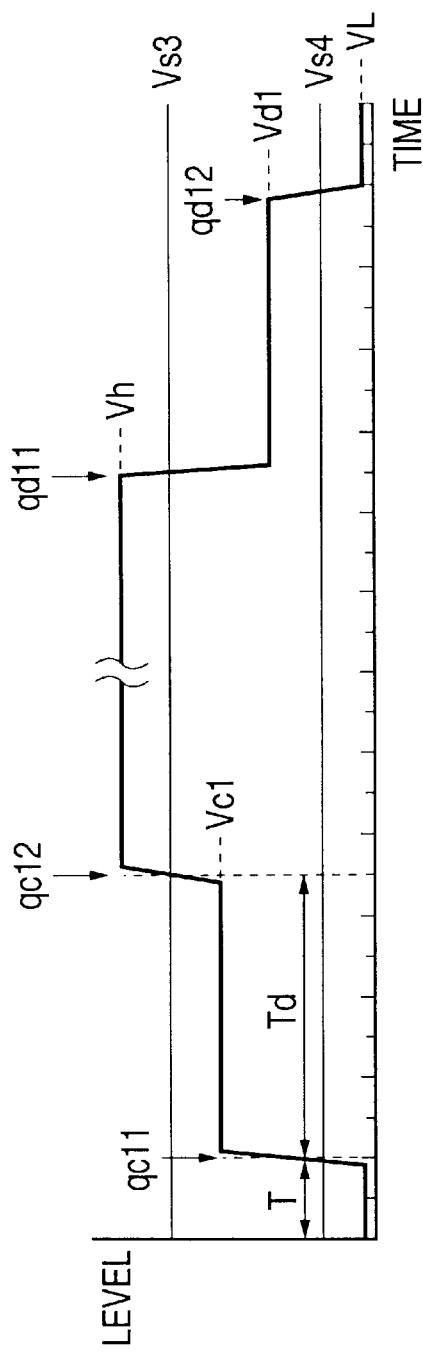
FIG. 20 is a diagram showing a signal waveform in the case where the controlling signal marks in FIG. 19 are detected by the controlling signal detection circuit in FIG. 16.

FIG. 19 is a diagram showing another example of controlling signal marks which are previously recorded on the magneto-optical recording medium. In this example, sufficiently long controlling signal marks 58 and 59 are recorded, a magnetic wall Qc1 is formed on the front side of the controlling signal mark 58, and a magnetic wall Qd1 is formed between the controlling signal marks 58 and 59. Even in the case of using the controlling signal marks, the control of the power of the light beam and the setting of the slice level can be performed by the control circuit in FIG. 16. Specifically, first, the controlling signal is amplified by the amplifying circuit 6 together with the information signal and is inputted from the input terminal 33 to the control circuit 9. The controlling signal detection circuit 29 separates and detects the controlling signals from the input signal and supplies them to the time difference measuring circuit 30 and slice level setting circuit 31. FIG. 20 shows an output signal of the controlling signal detection circuit 30 when the controlling signals in FIG. 19 have been recorded. In FIG. 20, a change in signal level corresponding to the first magnetic wall displacement of the magnetic wall Qc1 in FIG. 19 corresponds to qc11. Similarly, a change in signal level corresponding to the second magnetic wall displacement of the magnetic wall Qc1 corresponds to qc12. A change in signal level corresponding to the first magnetic wall displacement of the magnetic wall Qd1 corresponds to qd11 and a change in signal level corresponding to the second magnetic wall displacement of the magnetic wall Qd1 corresponds to qd12, respectively.

The time difference measuring circuit 30 measures a time difference between the timing of the occurrence of the first magnetic wall displacement of the magnetic wall and the timing of the occurrence of the second magnetic wall displacement of the same magnetic wall, for example, a time difference between a time point shown by qc11 and a time point shown by qc12 or a time difference between a time point shown by qd11 and a time point shown by qd12. The differential detection circuit 32 detects a difference signal between the measured time difference Td and the predetermined value T0. Now, assuming that a time duration of the information signal mark which is recorded is equal to, for example, nT (where n is an integer of 1 or more and T is a constant), the predetermined value To is set to (m−(½))T (where m is an integer of 1 or more) (for example, T0=3.5 T).

The detected difference signal is outputted to the laser drive circuit 10 in FIG. 9 from the output terminal 35. The laser drive circuit 10 controls a current to be supplied to the laser light source 5 on the basis of the inputted difference signal, thereby controlling the power of the light beam 46 so that a temperature distribution such that the time difference Td always coincides with the predetermined value T0 is formed in the magnetic layer 41. By controlling as mentioned above, similarly, a proper temperature distribution is always formed in the magnetic layer irrespective of a variation in thermal characteristics of each magnetic recording medium, a fluctuation in environmental temperature, and the like. The information signal can be reproduced more stably and with a high reliability.

Subsequently, in the case of setting the slice level, the slice level setting circuit 31 detects a signal level Vc1 before the second magnetic wall displacement of the magnetic wall Qc1 and the signal level Vh after the second magnetic wall displacement and sets a value between the signal levels Vc1 and Vh as a slice level Vs3 used in the second embodiment. On the other hand, the signal level Vd1 before the second magnetic wall displacement of the magnetic wall Qd1 and the signal level VL after the second magnetic wall displacement are detected. A value between the signal levels Vd1 and VL is set as a slice level Vs4 used in the second embodiment and is outputted from the output terminal 34.

Figure 21:
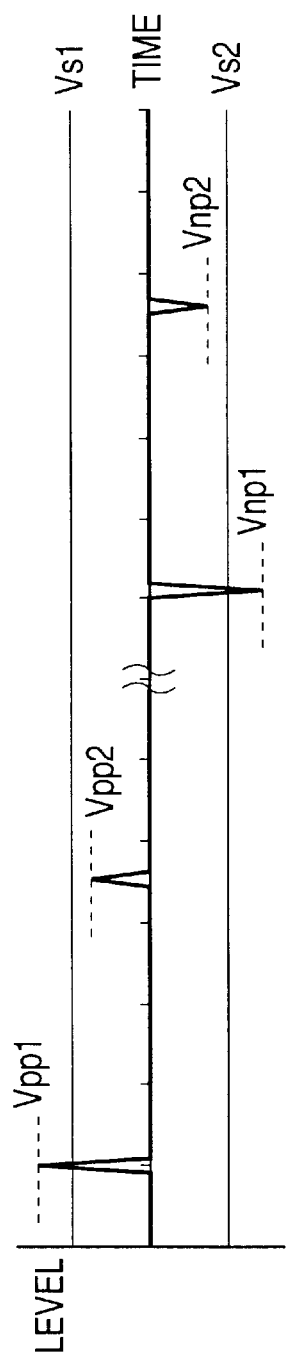
FIG. 21 is a diagram showing a differentiated signal waveform of the signal in FIG. 20 by a slice level setting circuit in the control circuit in FIG. 16.

The slice level setting circuit 31 differentiates the input signal, forms a differentiated signal as shown in FIG. 21, and detects the peak level Vpp1 of a positive pulse signal corresponding to the first magnetic wall displacement of the magnetic wall Qc1, the peak level Vnp1 of a negative pulse signal corresponding to the first magnetic wall displacement of the magnetic wall Qd1, the peak level Vpp2 of a positive pulse signal corresponding to the second magnetic wall displacement of the magnetic wall Qc1, and the peak level Vnp2 of a negative pulse signal corresponding to the second magnetic wall displacement of the magnetic wall Qd1, respectively. A value between the peak levels Vpp1 and Vpp2 is set as a slice level Vs1 used in the first embodiment. A value between the peak levels Vnp1 and Vnp2 is set as a slice level Vs2 used in the first embodiment. Those values are outputted from the output terminal 34. By setting the slice level as mentioned above, the information signal can be reproduced more stably and with a high reliability without being influenced by a variation in signal characteristics of each magnetic recording medium and a fluctuation in signal level.

According to the signal reproducing apparatus in the above embodiment, the light beam is irradiated onto the magneto-optical recording medium as a magnetic recording medium by the optical head and the displacement of the magnetic wall in the magnetic wall displacing layer is detected from the reflected light. However, the signal reproducing apparatus in the invention is not limited to the above method but also can be constructed in a manner such that, for instance, the displacement of the magnetic wall in the magnetic wall displacing layer of the magnetic recording medium is detected by the magnetic head. In such a signal reproducing apparatus, a change in magnetic flux which leaks from the magnetic recording medium in association with the displacement of the magnetic wall in the magnetic displacing layer can be detected by a magnetic head of an MR (magnetoresistive effect) type or an inductive type provided near the magnetic recording medium.

According to the invention as described above, since the occurrence of the first magnetic wall displacement and the occurrence of the second magnetic wall displacement are separated with respect to time, a situation such that the pulse signal corresponding to the first magnetic wall displacement and the pulse signal corresponding to the second magnetic wall displacement are overlapped to be cancelled does not occur. The signal change corresponding to both of the first and second magnetic wall displacements can be certainly detected. Since only the signal corresponding to one of the first and second magnetic wall displacements is selectively detected by the signal discriminating means, a situation such that the pulse signal corresponding to the recorded information signal is dropped out and the erroneous pulse signal is generated does not occur. Therefore, the information signal can be accurately reproduced.

What is claimed is:

1. A signal reproducing apparatus for reproducing a micro mark by causing a magnetic wall to be displaced on a magnetic recording medium, said apparatus comprising:

heating means which applies a partial temperature distribution onto the medium and is adapted to move relative to the medium;

reproducing means which detects a magnetization direction on the medium and is adapted to move relative to the medium; and means for controlling said heating means so as to form such a temperature distribution as to separate, with respect to time, an occurrence of a first magnetic wall displacement from the front side of a temperature peak position in the temperature distribution toward the temperature peak position and an occurrence of a second magnetic wall displacement from the backside of the temperature peak position toward the temperature peak position.

2. An apparatus according to claim 1, further comprising signal processing means for extracting only one of a reproduction signal corresponding to the first magnetic wall displacement and a reproduction signal corresponding to the second magnetic wall displacement from a reproduction signal detected by said reproducing means.

3. An apparatus according to claim 2, wherein said signal processing means includes:

a differentiating circuit for differentiating the reproduction signal; and a comparison circuit for comparing an output signal of said differentiating circuit with a predetermined slice level and for extracting only one of the reproduction signals corresponding to the first and second magnetic wall displacements.

4. An apparatus according to claim 2, wherein said signal processing means includes:

a comparison circuit for comparing the reproduction signal with a plurality of slice levels;

a window generating circuit for generating a predetermined window signal; and an extracting circuit for extracting only one of the reproduction signals corresponding to the first and second magnetic wall displacements on the basis of an output of said comparison circuit and the window signal.

5. An apparatus according to claim 1, wherein when a time duration of the micro mark is nT, where n is an integer of at least 1 and T is a reproduction clock period, a timing of the occurrence of the second magnetic wall displacement is delayed more than a timing of the occurrence of the first magnetic wall displacement by only a time $Td=(m-(½))T$, where m is an integer of at least 1.

6. An apparatus according to claim 1, wherein on the basis of a reproduction signal of a controlling signal recorded on the medium, said control means measures a delay time of a timing of the occurrence of the second magnetic wall displacement for a timing of the occurrence of the first magnetic wall displacement and controls said heating means so that the measured delay time is equal to a desired delay time.

7. An apparatus according to claim 6, wherein the controlling signal has previously been recorded on the medium at every predetermined period.

8. An apparatus according to claim 4, wherein said control means sets the plurality of slice levels on the basis of a reproduction signal of a controlling signal recorded on the medium.

9. An apparatus according to claim 1, wherein said heating means forms the temperature distribution by a light beam.

10. An apparatus according to claim 9, wherein said reproducing means detects the magnetic wall displacement by a light beam.

11. An apparatus according to claim 10, wherein the light beam used in said heating means and the light beam used in said reproducing means are the same beam.

12. A signal reproducing apparatus for reproducing a micro mark by causing a magnetic domain wall to displace on a magnetic recording medium, said apparatus comprising:

heating means which applies a partial temperature distribution onto the medium and is adapted to move relative to the medium; and reproducing means which detects a magnetization direction on the medium and is adapted to move relative to the medium, wherein (i) the temperature distribution is formed so as to satisfy a condition of $Td=(m-(½))T$, provided a time length of the micro mark is $nT$, in which n is an integer of at least 1, T is a reproduction clock period and n is an integer of at least 1, and (ii) $Td=L/V$, in which V is a moving speed of the medium, L is a distance between positions Xs and Ys, in which Xs is a position that is located in front of a peak of the temperature distribution and when the magnetic domain wall attains the position Xs, the magnetic domain wall proceeds toward the peak, which is called a first magnetic domain wall displacement, and Ys is a position that is located in the rear of the peak of the temperature distribution and when the magnetic domain wall attains the position Ys, the magnetic domain wall proceeds toward the peak, which is called a second magnetic domain wall displacement.

* * * * *

UNITED STATES PATENT AND TRADEMARK OFFICE
CERTIFICATE OF CORRECTION

PATENT NO. : 6,041,024

DATED : March 21, 2000

INVENTOR(S): KAZUYOSHI ISHII

It is certified that error appears in the above-identified patent and that said Letters Patent is hereby corrected as shown below:

Column 5

Line 6, Td1=mT." should read --Td1=2T.--.

Column 14

Line 56, To is" should read --TO is--.

Signed and Sealed this

Twenty-seventh Day of March, 2001

Attest:

NICHOLAS P. GODICI

Attesting Officer

Acting Director of the United States Patent and Trademark Office